(12) United States Patent
Lin et al.

(10) Patent No.: US 6,972,851 B2
(45) Date of Patent: Dec. 6, 2005

(54) APPROACHING APPARATUS USING SPECTRAL SHIFT FOR SAMPLE-PROBE DISTANCE REGULATION

(75) Inventors: Yao-Min Lin, Hsinchu (TW); Hau-Wei Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 335 days.

(21) Appl. No.: 10/638,433

(22) Filed: Aug. 12, 2003

(65) Prior Publication Data

US 2004/0125383 A1  Jul. 1, 2004

(30) Foreign Application Priority Data

Dec. 30, 2002  (TW)  .............................. 91137894 A

(51) Int. Cl.⁷ ............................................ G01B 11/14
(52) U.S. Cl. .................................................. 356/614
(58) Field of Search ................................ 356/614–622

(56) References Cited

U.S. PATENT DOCUMENTS

| 4,844,617 A | * | 7/1989 | Kelderman et al. ......... 356/624 |
| 6,034,774 A | * | 3/2000 | Marcus et al. .............. 356/511 |
| 6,750,960 B2 | * | 6/2004 | Bowers .................... 356/141.4 |
| 6,781,677 B1 | * | 8/2004 | Muenter et al. ........... 356/5.05 |

* cited by examiner

Primary Examiner—Hoa Q. Pham
(74) Attorney, Agent, or Firm—Bacon & Thomas PLLC

(57) ABSTRACT

An approaching apparatus based on spectral shift is disclosed, which includes a broadband light source, an optical-guide unit, and an optical receiving unit. The broadband light source emits a broadband light with the first central wavelength to the optical-guide unit and illuminates a sample via a probe within the optical-guide unit. A generated broadband light of the second central wavelength goes back the optical-guide unit via the original optical path to reach the optical receiving unit. Then, the receiving unit calculates the distance between the probe and the sample based on the characteristic curve of the approaching distance vs. the deviation of the first central wavelength. The deviation is used for feedback control so that the displacement driver moves the probe to adjust the distance between the probe and the sample.

8 Claims, 2 Drawing Sheets

APPROACHING APPARATUS USING SPECTRAL SHIFT FOR SAMPLE-PROBE DISTANCE REGULATION

BACKGROUND OF THE INVENTION

1. Field of the Invention

The present invention relates to an approaching apparatus and, more particularly, to an approaching apparatus based on spectral shift which can be integrated into traditional SNOM (Scanning Near-field Optical Microscope). It can be applied to the optical pickup head, terabyte datastorage, nano-optics inspection platform, and fiber array probe etc.

2. Description of Related Art

Generally, optical and spectral method offer rich information in material inspection and manufacture process diagnosis. These information, including the chemical composition, stress, polarization, chemical bonding, and other related parameters, are essential in the research of material science. However, in performing a measurement in nanometer scale, the typical instrument of optical analysis or spectrum analysis is unable to focus light on a sample in nanometer scale due to the optical diffraction limit. A solution for this problem is to incorporate a fiber nanoprobe into a scanning near-field optical microscope prior to measure the same. Using the near-field optical method, light can be focused in nanometer scale and break through the diffraction-limit. A well-known nanoprobe approaching technique vibrates the probe periodically employing a vibration mechanism. When the vibration signal occur the phase change or the amplitude decrease, the probe approach the sample in nanometer scale. For achieving this, the device for vibration driving, amplitude detecting, and phase change detecting are required. Hence the large dimension, high cost, complicated control are inevitable result.

Therefore, it is desirable to provide a novel approaching apparatus using a spectral shift for the sample-probe distance regulation in the nanometer scale to solve the preview problem.

SUMMARY OF THE INVENTION

An object of the present invention is to provide an approaching apparatus based on spectral shift. The apparatus has the advantages of the simple structure, effective cost and effortless integration.

This approaching apparatus comprise a broadband light source for generating a broadband light with the first central wavelength, a light-guide unit for directing the light to the sample and receiving a shifted broadband light of the second central wavelength from sample, and a light-receiving unit for receiving the shifted light from light-guide unit and calculating a distance between the probe and the target based on a difference between the first central wavelength and the second central wavelength.

The light-guide unit of the present invention further comprises a multimode detecting fiber and a displacement driver. The detecting fiber is coupled to a probe and is fixed on a displacement driver. The displacement driver communicates with the light-receiving unit and feedback the spectral shift value to it. The light-receiving unit comprises a photo-detector, a receiving fiber, and an operation module. The receiving fiber receives the shifted broadband light from light-guide unit and send this light to the photo-detector. Then the operation module obtains the difference between the first central wavelength and the second central wavelength and figures out the distance between the probe and the sample. For separating the incident broadband light and the shifted broadband light, a dichroic beam splitter between the broadband light source and the light-guide unit is placed.

Other objects, advantages, and novel features of the invention will become more apparent from the detailed description when taken in conjunction with the accompanying drawings.

DETAILED DESCRIPTION OF THE PREFERRED EMBODIMENT

Figure 1:
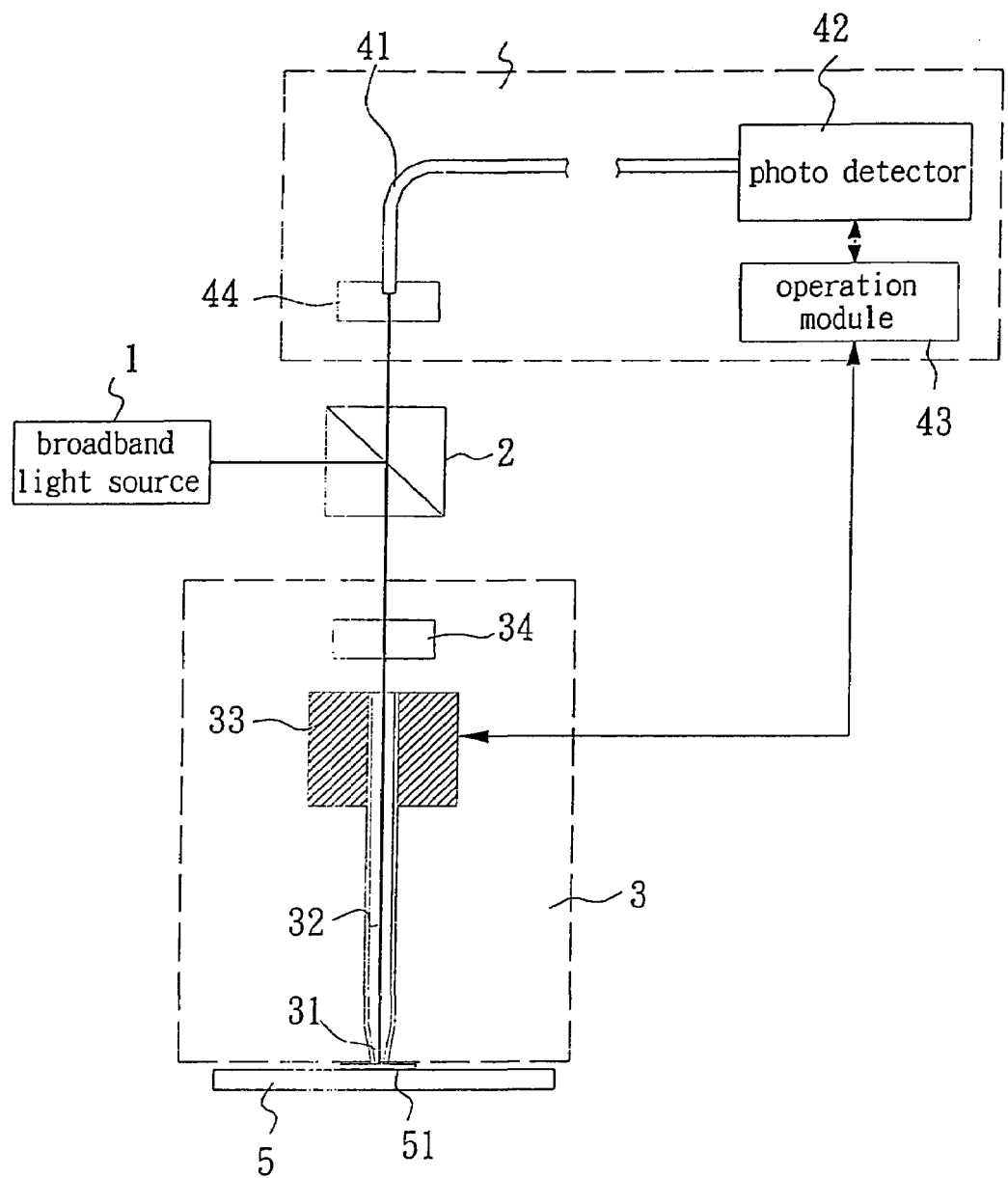
FIG. 1 presents a structure applicable for a preferred embodiment of the invention.

With reference to FIG. 1, there shown a structure applicable for a preferred embodiment of the invention. The approaching apparatus comprises a broadband light source 1, a dichroic beam splitter 2, a light-guide unit 3, and a light-receiving unit 4. The light-guide unit includes a probe 31, a detecting fiber 32, a displacement driver 33, and an optical coupler 34. The light-receiving unit 4 includes a receiving fiber 41, a photo-detector 42, an operation module 43, and an optical coupler 44. In the embodiment, the dichroic beam splitter 2 is preferably a prism to reflect light and transmit light for two different colored bands. Preferably, the probe 31 is a fiber probe, the detecting fiber 32 is a multi-mode fiber. And the material of probe 31 is same as the detecting fiber 32. Also preferably, the displacement driver 33 is a piezoelectric displacement-driving controller, the receiving fiber 41 is a multi-mode fiber, and the operation module 43 is a microprocessor.

The broadband light source 1 generates a broadband light having the first central wavelength. Here the central wavelength means a wavelength location having a maximum intensity. This broadband light incidents to the dichroic beam splitter 2 and reflects to the optical coupler 34. The optical coupler 34 directs the broadband light to a sample 51 on a moveable sample stage 5 via the detecting fiber 32. In order to adjust a distance between the probe 31 and the sample 51, the detecting fiber 32 is fixed on the displacement driver 33.

Figure 2:
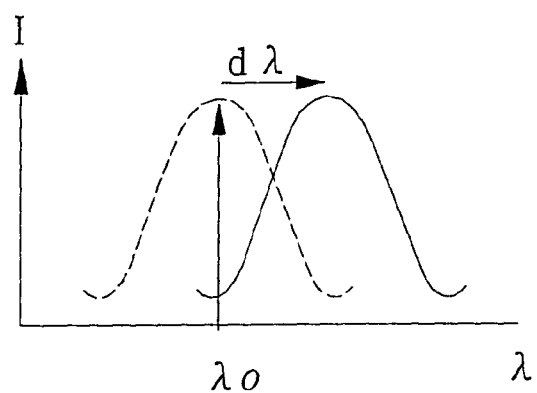
FIG. 2 plots the central wavelength shift of incident broadband source in the embodiment of the invention.
Figure 3:
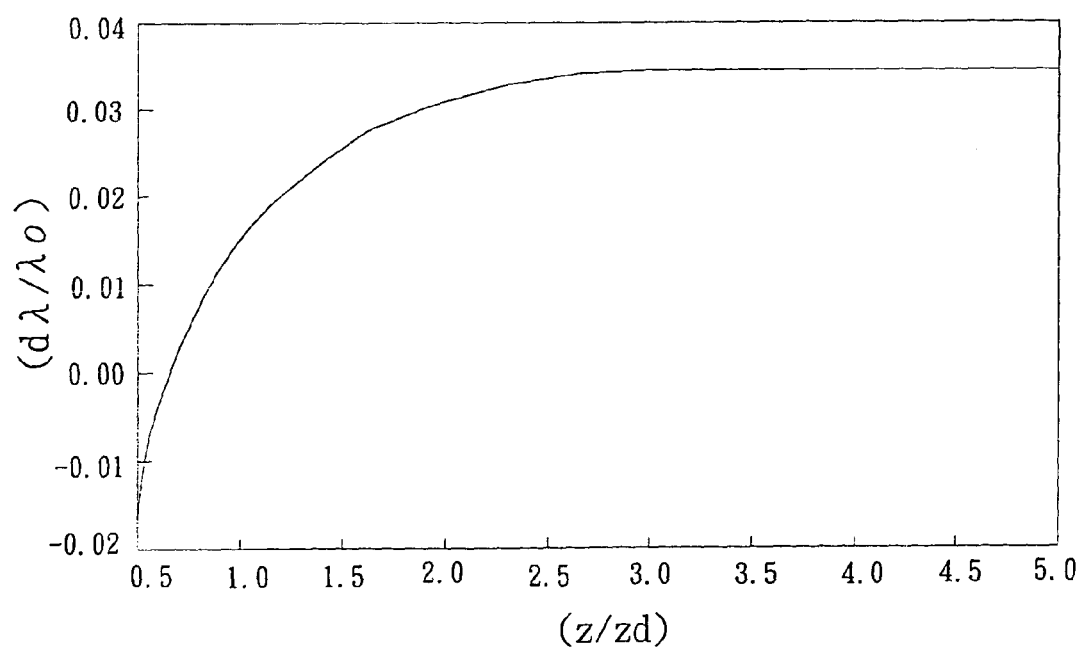
FIG. 3 plots the central wavelength shift versus approaching distance between probe and sample for a curve in the embodiment of the invention.

The broadband light is reflected from the sample 51 and a shifted broadband light of the second central wavelength is made. Preferably, the second central wavelength is shifted at least one nanometer from the first central wavelength base on the source correlation. The shifted broadband light is reflected back to the detecting fiber 32 and is directed to the photo-detector 42 via the optical coupler 44 and the receiving fiber 41. The photo-detector 42 then detects the broadband light to obtain a spectral shift value $d\lambda$, i.e., a wavelength deviation relative to the first central wavelength. The $d\lambda$ vary with the probe-sample distance. The best illustrated by referring to FIG. 2 which plots incident light $\lambda_0$ versus the shifted value $\lambda_0+d\lambda$. Based on a spectral shift theory proposed by Wolf, the deviation of central wavelength $d\lambda$ versus distance z between the probe 31 and the sample 51 is shown in FIG. 3 of curve graph. Here the Zd is a predetermined distance constant and $\lambda_0$ is a central wavelength of incident light.

The photo-detector 42 sends the obtained spectrum to the operation module 43. The operation module 43 calculates a distance between the probe 31 and the sample 51 based on the curve shown in FIG. 3. If the measured distance is not equal to the target value, the differences feedback to the displacement driver 33 to adjust until both distance equal. Then the optical and spectral characteristics of the sample 51 are measured in nanometer scale.

Although the present invention has been explained in relation to its preferred embodiment, it is to be understood that many other possible modifications and variations can be made without departing from the spirit and scope of the invention as hereinafter claimed.

What is claimed is:

1. An approaching apparatus based on spectral shift for measuring a sample, comprising:
    a broadband light source for generating a broadband light with a first central wavelength;
    a light-guide unit including a probe for illuminating the sample and receiving a shifted light of a second central wavelength from sample; and
    a light-receiving unit for receiving the shifted light from the light-guide unit and calculating a distance between the probe and the sample based on a deviation of the first central wavelength.

2. The approaching apparatus as claimed in claim 1, wherein the light-guide unit further comprises a detecting fiber coupled to the probe and a displacement driver connected with the detecting fiber, and the displacement driver is operated to adjust the distance between the probe and the target.

3. The approaching apparatus as claimed in claim 2, wherein the displacement driver is coupled to the light-receiving unit so that the light-receiving unit is able to feedback the distance difference to the displacement driver for adjusting the distance between the probe and the sample.

4. The approaching apparatus as claimed in claim 2, wherein the detecting fiber is a multi-mode fiber.

5. The approaching apparatus as claimed in claim 1, wherein the light-receiving unit comprises a photo-detector and a receiving fiber for receiving the shifted broadband light and sending the same to the photo-detector to obtain the difference between the first central wavelength and the second central wavelength.

6. The approaching apparatus as claimed in claim 1, wherein the light-receiving unit further comprises an operation module for calculating the distance between the probe and the sample.

7. The approaching apparatus as claimed in claim 1, further comprises a dichroic beam splitter between the broadband light source and the light-guide unit for separating the incident broadband light from the shifted broadband light.

8. The approaching apparatus as claimed in claim 7, the dichroic beam splitter is a prism for separating light into two color bands.

\* \* \* \* \*